United States Patent Office 3,326,719
Patented June 20, 1967

3,326,719
METAL COATING PROCESS
Morton Beltzer, New York, N.Y., and Duane G. Levine, Colonia, and Carl E. Heath, Jr., Berkeley Heights, N.J., assignors to Esso Research and Engineering Company, a corporation of Delaware
No Drawing. Filed Nov. 7, 1963, Ser. No. 322,032
12 Claims. (Cl. 117—213)

This application is a continuation-in-part of our copending applications S.N. 163,751 filed Jan. 2, 1962 and now abandoned entitled "Fuel Cell," and S. N. 163,822 filed Jan. 2, 1962 and now abandoned entitled, "Metal Coating Process."

This invention relates to a method of metal coating nonconductive porous and nonporous substrates and to such metal coated nonconductive substrates. More particularly, it relates to metal coating such substrates by first dyeing the substrate, then contacting the substrate with a metal salt solution to form, in situ, discontinuous catalytic metal sites upon the substrate and then contacting the substrate with a metal salt and reducing agent solution in order to obtain a continuous metal coating and to such metal coated substrates.

The metal coated products which can be prepared in accordance with the process of this invention are many and varied. Some of the important uses for which the products made by this invention can be used include the preparation of printed circuitry for electrical systems, preparation of pressure sensitive variable resistors, particulate catalysts for use in petroleum refining and chemical processes, metal coated porous substrates for use as electrodes in electrochemical cells, decorative paneling and electrical resistors for use in electric heaters and appliances.

The production of metal coated nonconductive substrates for use as electrical components is a well-known and developed art. Sometimes the conductive metal areas are provided by laminating a conductive metal sheet to a substrate of nonconductive material and then etching away the metal from those areas where the conductor material is not desired. Other procedures utilize special photoengraving, photographic or electrochemical plating procedures. In all of such cases, the main consideration has been the formation of a metal coating which will adhere to the nonconductive body and will not peel or pull away from such nonconductive body during subsequent fabrication or use. Notwithstanding the wide variety of procedures which are well-known in the art, a satisfactory procedure which does not have serious objections has not been developed. Either the methods were costly, required extensive equipment and were cumbersome to operate or they proved to be less than adequate on a commercial scale.

The deposition of metal coatings such as silver and copper on glass in the mirror-making art is also well-known and developed. The problems involved in making mirrors are quite different from those involved in the fabrication of electrical components. In this regard, see U.S. Patent 3,035,944. The biggest drawback in applying the mirroring techniques to methods directed toward making electrical components is that the mirroring techniques tend to produce thick, continuous layers and does not produce a coating which is strongly adherent to the substrate.

Other methods of metal coating nonconductive substrates include the pressing of finely divided metal powders or fine mesh metal sieves into a surface of a partially polymerized resin or into a material wherein a completely polymerized resin is found in a thermoplastic resin matrix. In other methods a thermoplastic binder has been employed to cause the metal particles to adhere to a membrane surface. Electrical components prepared by these methods are subject to certain deficiencies. A continuous layer of conducting material essential to the transmission of electrons to or from all parts of the electrical component is difficult to achieve and even more difficult to maintain when such transmission is to be effected solely through the physical contact of a large number of particulate solids. Furthermore, when desiring to make electrical components for use as electrodes, the impressing of finely divided metallic particles into a soft, spongy or partially polymerized surface tends to clog the pores of the substrate. In addition, finely divided metallic particles, although physically adherent to the substrate, tend to increase the distortion of the substrate.

It has now been discovered that by means of the present invention we can obtain unexpectedly strong adherence between electrically conductive metal layers and the nonconductive substrates such as ceramics, fritted glass, resinous and synthetic plastics and hydrocarbon membranes by dyeing the substrate with a reduced dye or by reducing the dye after it is applied to the substrate, treating the dyed substrate with a noble metal thereby making a thin, discontinuous metal coating on the dyed area of the substrate. Then, by subsequently contacting the substrate with a solution comprising a metal salt selected from the group consisting of copper, nickel and silver, a continuous metal coating is formed. In the case of porous substrates, the continuous metal coating applied by the foregoing procedure results in an electrical component having substantially the same porosity as the substrate before being metal coated. Therefore, this procedure is especially valuable in making electrodes for use in electrochemical and fuel cells.

By means of the instant invention, a nonconductive substrate can either be pattern coated or completely coated with the metal. In the case of pattern coating, the substrate can either be masked before or after the dyeing step of the instant invention. If a printed circuit has to be made, the pattern coating would of necessity be used. If an electrode is to be made, the substrate would be completely coated, that is, except for the orifices of the pores. It is, of course, obvious that if the substrate is to be pattern coated, the areas of the substrate not to be metal coated should be masked with a wax or other suitable material. The steps of the procedure are: (1) dyeing the substrate with an aqueous solution comprising a dye and a hydrosulfiite or dyeing the substrate with the water soluble dye and then treating the dyed substrate with a solution of sodium or potassium hydrosulfite, (2) contacting the dyed substrate with an aqueous solution of a salt of a metal selected from the group consisting of silver, gold, platinum and palladium for about 0.01 to 5 minutes to deposit the metal in a discontinuous coating, and (3) contacting the substrate with a solution comprising a reducing agent and a salt of a metal selected from the metals consisting of silver, nickel and copper. The thickness of the silver, nickel or copper layer can be controlled by the number of times the catalytic reduction process is carried out, by varying the concentration of the silver, nickel or copper ions and reducing agent in the solution, by varying the time of contact of the solution, by varying the temperature and controlling the pH of the solution since the rate of deposition increases with an increase in pH. Using these guides, one skilled in the art can by routine experimentation, control this process so as to lay down a metal surface of any desired thickness. It will generally be preferred to carry out the process at room temperature. However, any temperature above the freezing point and below the boiling point of the solution can be used.

Once a continuous layer of either silver, nickel or copper is formed on the substrate, other metals can be electrodeposited upon such metal layer using the metal surfaced substrate as a cathode in a conventional electrodeposition cell having an electrolyte bath containing the desired metal ion, such as copper, the noble metals such as platinum, gold, iridium, rhodium, palladium and ruthenium and the transition metals such as nickel, chromium, iron and cobalt. In addition to electrodepositing another metal upon the silver, nickel or copper coating, a more electronegative metal can be exchanged for the silver, nickel or copper. The electronegativity of a metal can be determined from the electromotive force series of the elements wherein lithium and rubidium are electropositive and platinum and gold are electronegative.

The substrates which can be metal coated or pattern coated by the process of this invention include materials such as fritted glass, wood, zeolites, rubber, hydrocarbon polymers such as polystyrene, polyethylene, polypropylene, butyl rubber, ethylene-propylene copolymers, cloth, cellulose acetate and materials which although containing conductive materials have such conductors dispersed throughout materials of relatively low conductivity such as mixtures of carbon or alumina with hydrocarbon polymers such as polypropylene, polyethylene or a halogenated hydrocarbon such as tetrafluoroethylene and dichlorodifluoroethylene.

The process of this invention is quite suitable for pattern coating a metal onto a substrate since the area of the substrate to be coated can be controlled by the dyeing step. This is, the metal catalyst will be deposited only upon the area of the substrate which has been dyed and the subsequent metal layer will be deposited only upon the catalyst sites.

The reducing agents which can be used with this invention include the known silver, nickel and copper, reducing agents such as hydroquinone, hydroquinone and gum arabic, formaldehyde, alkali metal thiosulfates and alkali metal hypophosphites such as sodium and potassium.

Water soluble dyes which can be used with this invention include the following classes of dyes:

| Dye class: | Example of class |
|---|---|
| Indamine | Bindschedler's Green, Tolylene Blue. |
| Indophenol | 2,6-dichlorophenol-indophenol. |
| Oxazine | Gallocyanine. |
| Thiazine | Methylene Blue. |
| Indigoid | Indigo-disulfonate. |
| Azine | Phenosafranine, Induline Scarlet, Neutral Red. |

Other dyes which are not appreciably water soluble may be used with certain substrates by making suitable modifications in their application, such modifications being known in the art of applying such dyes.

In the application of such dyes adsorption is due to nonspecifiic coulombic attractive forces between the dye and the surface, e.g. the organic matrix of a membrane surface. When the surface is then contacted with a solution of silver, gold, platinum or palladium salts, the corresponding metal is formed on the surface providing a plurality of catalyst sites having a greater continuity than is possible with untreated surfaces. An extraneous reducing agent is not required in this catalyst fixing step. Once the initial metal sites are formed on the surface, the rapid reduction of silver ions may be carried out. This may be followed by metal exchange as hereinafter described, or coating as by electrodeposition of other metals on the silver surface or upon the metal used to displace silver.

Gold, platinum, palladium and silver catalyze the reduction of nickel ion in the presence of a reducing agent. When the process is employed for nickel plating, the procedure aforedescribed for silver plating is followed with the following exceptions. The ions of gold, platinum, silver or palladium are applied to the oxidation-reduction surface as previously described to establish the fixed catalyst site. The catalyst fixed area is then contacted with an aqueous solution containing nickel ions and a strong reducing agent such as a hypophosphite salt, e.g. sodium or potassium hypophosphite. This embodiment is preferably carried out at temperatures above about 65° C.

The membranes employed as components for fuel cells or electrolytic cells in accordance with this invention may be cationic, anionic or nonionic. In electrochemical cells they may be employed, when coated, as electrodes, electrolyte partitions, and electrode-electrolyte combinations. These membranes may therefore include such representative types of membranes as ion-exchange resin membranes and nonionic or ion-exchange interpolymer membranes.

Membranes to be used with this invention can be porous structures with such pores providing a series of minute openings in the surface to be metallized. The membrane presents a continuous surface extending between and around such openings and it is to this surface that the coating process of this invention is directed.

Ion-exchange resin membranes, i.e. organic membranes, at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

The best known of the ion-exchange membranes are the ion-exchange resin membranes which may be prepared by copolymerizing a mixture of ingredients one of which contains an ionogenic substituent. In the case of cationic-exchange resins, these groups are acidic groups, such as the sulfonic acid group, the carboxylic acid group, and the like. In the case of anion-exchange resins, the group is basic in nature and may comprise amine groups, ordinary ammonium groups, the guanidine group, the dicyandiamine group and other nitrogen-containing basic groups. In the case of these anion-exchange resins, the ionizable group is attached to a polymeric compound, such as phenol-formaldehyde resin, a polystyrene divinylbenzene copolymer, a urea-formaldehyde resin, a melamine-formaldehyde resin, a polyalkylene-polyamine-formaldehyde resin, etc. Thus, typical cation resins may be prepared by copolymerizing a n-phenol sulfonic acid with formaldehyde. A typical anion resin may be prepared by copolymerizing a mixture of phenol, formaldehyde and triethylenetetramine. The preparation and properties of a number of different types of cation-exchange resins are described throughout the literature and in particular in "Ion Exchange," Nachod, Academic Press, Inc., New York (1950); "Ion Exchange Resins," Kunin and Myers, John Wiley & Sons, Inc., New York (1950); "Styrene, Its Polymers and Copolymers and Derivatives," Boundy and Boyer, Reinhold, New York (1950), and in various U.S. patents, e.g. Langer, 2,891,999 and 2,861,045; Bodamer, 2,681,319–20; D'Alelio, 2,366,007–8 and 2,663,702; Hutchison 2,678,306; Ferris, 2,658,042, etc, The formation of these ion-exchange resins into membrane or sheet form is well known in the art. In general these membranes are of two forms, the mosaic in which granules of ion-exchange resin are incorporated into a sheet-like matrix of a suitable binder, such as a binder of polyethylene or polyvinyl chloride, and the continuous ion-exchange resin membrane in which the entire membrane structure has ion-exchange characteristics. The latter type of membrane may be formed by molding or casting a partially polymerized ion-exchange resin into sheet form. The formation of these ion-exchange membranes is described, for example, in "Amberplex Ion Permeable Membranes," Rohm & Haas Co., Philadelphia (1952), and in the references mentioned in this publication.

The ion-exchange resin membranes above-described have heretofore been employed in fuel cells as electrolytes, electrolyte dividers, etc. and may be used in the practice of this invention. However, membranes of this type ordinarily have a relatively high internal electrolytic resistance and are suitable for making printed circuits and condensers but they are not as desirable for use in electrochemical cells as are the so-called interpolymer ion-exchange membranes.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and acrylonitrile in N,N-dimethylformamide, casting the solution as a film and evaporating off the solvent. The type of polyelectrolyte used can range from the strong acid type as described above to those which are strong bases, such as quaternary polyvinylimidazolium hydroxides. Membranes of this type are described in U.S. Patent 2,957,206. See also articles by H. P. Gregor et al. in vol. 61, Journal of Physical Chemistry, 1957 at pages 141, 151 and 197 and the pages immediately following these citations.

The membranes under consideration are porous in most fuel cell embodiments and their value for use in these fuel cell embodiments depends upon maintaining such porosity so as to admit of contact of fuel or oxidant with electrolyte and to admit of ionic transfer through the membrane. This process allows for confining the deposition of silver to the exterior membrane surface. This is made possible because the rate of the catalytic reduction process is much faster than diffusion into the membrane pores. Likewise, the catalytic reduction reaction occurring on the membrane surface, i.e. in the presence of the previously formed catalyst sites of silver, gold, platinum or palladium is much faster than the noncatalyzed silver ion reduction in the bulk solution, i.e. that part of the treating solution not in contact with such sites. Therefore, silver ion escaping into the pores with reducing agent would be reduced at a much slower rate than that on the surface and can be readily removed after the reduction process on the surface is complete. Such removal may be effected by passing an eluting agent through such pores, for example, a solution of thiosulfate or concentrated iodide, chloride or cyanide solutions, etc.

Once a continuous layer of silver is formed on the membrane other materials can be electrodeposited over the silver as aforementioned. Thus, the metals known in the art for their catalytic effect when employed upon fuel cell electrodes may be superimposed upon the silver layer. When the membrane is to be used with an acid electrolyte, these would include the noble metals such as platinum, gold, iridium, rhodium, palladium, etc. and various combinations of such metals, e.g. platinum and gold, palladium and iridium, etc. When the membrane is to be used in a basic electrolyte, these would include in addition to the aforesaid noble metals those metals heretofore disclosed for use in KOH electrolyte, e.g. nickel, chromium, and various transition metals. If desired, gold, platinum, palladium or any of the more noble metals may be substituted for the silver layer on the membrane by contacting the layer of silver with an aqueous solution containing ions of such metal until a desired amount of the resulting substitution reaction occurs. This process is well-known in the art. When the membranes are employed as fuel cell electrodes, the metal and membrane combination is preferably of a thickness in the range of about 2 to 20 mils, more preferably 2 to 12 mils. The metal layer formed on the membrane surface preferably is thin enough that such layer does not substantially reduce the flexibility of the uncoated membrane. The metal layer on one side of the membrane will therefore preferably be in the range of about 0.0001 to 0.001 inch to minimize diffusion distance for fuel or oxidant to the electrolyte and to preserve flexibility. The temperature tolerance of membranes treated in accordance with this invention, particularly interpolymer membranes, is appreciably increased since the binding of the metal to the membrane, resulting from in situ reduction as hereinbefore described, permits the metal to resist to a considerable degree the tendency of the membrane to shrink upon reaching the upper limit of its temperature tolerance in the untreated state. The membranes prepared in accordance with this invention may be advantageously employed in any of the fuel cell uses to which ion-exchange membranes have been heretofore employed in the art and they may be metallized on one side only or on two opposite sides and employed as electrodes or electrolyte dividers. When the membrane does not have internal ion-exchange properties, ionic transfer between the electrodes is provided by filling the pores of the membrane with a conventional liquid electrolyte, e.g. $H_2SO_4$, KOH, etc. This additional liquid electrolyte also may be employed to equilibrate regular ion-exchange membranes in the same manner or such membranes may, when hydrated, serve as the sole electrolyte.

While the foregoing description has been directed to one embodiment of this invention, namely fuel cell components wherein the substrate covered is an organic membrane, it should be understood that other types of fuel cell electrodes may be prepared by this process where it is desired to provide a conductive surface upon a relatively nonconductive substrate or to affix a suitable metal catalyst to an electrode which is already a good electron conductor. These embodiments will be illustrated in the examples hereinafter set forth.

The following examples are illustrative of the process of this invention and should not be construed as limitations upon the true scope of this invention as set forth in the specification and claims.

*Example 1*

A 100 square inch interpolymer membrane, prepared by dissolving linear polystyrene and a copolymer of acrylonitrile and vinyl chloride in butyrolactone, casting the solution as a film and evaporating off the solvent, is contacted with about 125 cc. of a 2 gms./liter Methylene Blue aqueous solution for about 2 minutes. The membrane is washed with distilled water until no dye is present in the wash water. The membrane in the wet state is contacted with about 150 cc. of a solution containing 0.05 molar NaOH and 0.1 molar $Na_2S_2O_4$. The membrane turns colorless indicating complete reduction of the adsorbed Methylene Blue to the colorless "leuco" form.

To prove that the "leuco" form is also irreversibly adsorbed, the reducing solution is washed off and the membrane is exposed to the atmosphere. Upon contact with the atmosphere, the adsorbed leuco form is immediately reoxidized as manifested by the return of the blue color to the membrane. This procedure is repeated a number of times establishing that the dye can be alternatively oxidized and reduced in the adsorbed state.

The membrane is again washed off with distilled water, taking care to preclude contact of the membrane with the atmosphere. When the wash water has the same pH as tap water, 100 ml. of 0.1 normal silver nitrate solution is brought into contact with the membrane surface. The membrane turns blue to blue green and a uniform dispersion of metallic silver of high-surface density is formed on the dyed membrane surface. The process is repeated with similar membranes except that soluble salts of gold, platinum and palladium are employed in lieu of the silver nitrate. Each of the dyed surfaces has a dense uniform dispersal of tightly held catalyst sites of the corresponding metal.

The surface is then contacted with an aqueous solution containing 2 cc. of 25 wt. percent $AgNO_3$ to which is added a 100 cc. aqueous solution of hydroquinone and gum arabic. The hydroquinone concentration is about 0.14 mole/liter and that of gum arabic about 2 gms./liter. A continuous film of silver is quickly formed over the dyed surface and the aforementioned catalyst sites. The silver is added for about 5 to 10 minutes until the resistance across a 10" x 10" sheet of this membrane is about 0.014 ohm.

*Example 2*

The procedure of Example 1 is repeated except that with separate membranes Bindschedler's Green, 2,6-dichlorophenol-indophenol, Toluylene Blue, gallocyanine, indigo-disulfonate, phenosafranine, Induline Scarlet and Neutral Red are used in lieu of Methylene Blue dye.

*Example 3*

The procedure of Example 1 is repeated without employing a dye upon a membrane consisting essentially of polyvinylhydroquinone and a binder.

*Example 4*

The procedure of Example 1 is repeated except that the membrane is prepared by dissolving linear polystyrene sulfonic acid and a copolymer of acrylonitrile and vinyl chloride in N,N-dimethylformamide, the solution cast as a film and the solvent evaporated off.

*Example 5*

The procedure of Example 1 is repeated except that the membrane is prepared by dissolving linear polystyrene sulfonic acid in collodion, pyroxylin dissolved in a mixture of diethyl ether and ethyl alcohol, the solution is cast as a film and the volatile components allowed to evaporate.

*Example 6*

A glass frit, i.e. a sintered glass cylinder having one closed end and an average pore diameter in the range of 10 to 20 microns is silver coated in depth, i.e. on the superficial external lateral surface and on the interior pore walls in the following manner. The frit is immersed in an aqueous solution of Methylene Blue, i.e. about 2 gms./liter and allowed to stand about 2 minutes until the dye is adsorbed both on the external surfaces and on the pore walls. The excess dye is washed off and then blown off with air and the frit is immersed in an aqueous solution of sodium hydrosulfite, i.e. about 0.1 molar, in 0.05 molar KOH and the dye is reduced as demonstrated by the change of color from blue to white. The frit is washed under water until the wash water is not alkaline. The frit is then contacted with an aqueous solution of $AgNO_3$, i.e. about 0.1 molar, for about 3 minutes. The dye returns to a bluish green color and a uniform distribution of silver particles are formed on the dyed surfaces with a high density per unit area. The frit with silver catalyst sites now fixed is again contacted with an aqueous solution of $AgNO_3$ and pyrogallol such that the concentration of the former is about 0.04 molar and the concentration of the latter is about 0.1 molar. A uniform silver surface is rapidly formed on the dyed surfaces. The frit is then immersed in aurous chloride for 10 minutes. The frit is then employed as the cathode of an electrodeposition cell where platinum is electrodeposited over the silver surfaces demonstrating the electrical conductivity of silver.

*Example 7*

The procedure of Example 4 is repeated except that palladium chloride is used in lieu of the first silver nitrate treatment and in lieu of the second silver nitrate treatment an aqueous solution of nickel chloride and sodium hypophosphite with a sodium acetate buffer until a continuous layer of nickel is formed on the dyed surfaces. This coating is carried out at about 70° C.

*Example 8*

A metal catalyzed porous carbon electrode is prepared in accordance with the process hereinbefore described in the following specific manner. A porous carbon cylinder closed at one end is placed under a vacuum, i.e. about 20 mm. Hg, and flooded with an aqueous solution of Methylene Blue and $Na_2S_2O_4$. The dye is allowed to remain in the structure for about 10 minutes. Also under vacuum, the excess dye is washed out of the pores, the structure is flooded with a dilute silver nitrate solution and allowed to stand 0.5 minute, the first silver nitrate solution is removed and a more concentrated silver nitrtae solution containing hydroquinone and gum arabic is passed through the pores until a continuous layer of silver is deposited on the dyed areas. The electrode is then soaked in an aqueous solution of aurous chloride for about 30 minutes. The electrode is then placed in an electrodeposition cell as the cathode thereof and platinum is electrodeposited upon the metal surface.

*Example 9*

The temperature tolerance of an untreated interpolymer membrane prepared as in Example 1 is compared with another membrane prepared and metal surfaced as in Example 1. After a short time, about 4 hours, the untreated membrane exhibits an area shrinkage of about 40% at 180° F. With the coated membrane no evidence of shrinkage is observable at 180° F. after 80 hours.

*Example 10*

A membrane electrode prepared as in Example 1 is employed as the fuel electrode or anode of an electrochemical cell wherein hydrogen gas is electrochemically oxidized at such anode. The polarizations obtained at different current densities are set forth in the following table:

TABLE I.—PLATED MEMBRANE ANODE PERFORMANCE WITH PLATINUM OVER GOLD AND SILVER IN 0.5 MOLAR $H_2SO_4$ WITH $H_2$ FUEL AT 80° F.

| Polarization in Volts From Theoretical Fuel Electrode [a] | At Indicated Amps./Ft.$^2$ [b] |
|---|---|
| .03 | 0 |
| .04 | 15 |
| .05 | 45 |
| .08 | 60 |

[a] The term "Polarization" wherever employed in this specification refers to the difference between observed voltage and the voltage of a reversible electrode operating with the same reactant, temperature, pressure and electrolyte. It does not refer to the difference between observed voltage and open circuit voltage (rest potential). Theoretical potential (at 80° F.), 1 atmosphere, and 0.5 molar $H_2SO_4$ is for the oxygen electrode about 1.174 volts below (negative to) Standard Hydrogen Reference and for the hydrogen electrode about .054 volts above said reference.

[b] Superficial area of anode facing electrolyte.

A membrane prepared and plated in the same manner is employed as the fuel electrode (anode) with methanol employed as the fuel. The polarizations obtained at different current densities are set forth in the following table:

TABLE II.—PLATED MEMBRANE ANODE PERFORMANCE WITH PLATINUM OVER GOLD AND SILVER IN 0.5 MOLAR $H_2SO_4$ WITH METHANOL AT 80° F.

| Polarization in Volts From Theoretical Fuel Electrode | At Indicated Amps./Ft.[2] |
|---|---|
| 0.12 | 0 |
| 0.53 | 105 |
| 0.53 | 120 |
| 0.54 | 180 |
| 0.55 | 300 |

A membrane prepared and plated in the same manner is employed as the oxygen electrode (cathode) of a fuel cell. The polarizations obtained at different current densities are set forth in the following table:

TABLE III.—PLATED MEMBRANE CATHODE PERFORMANCE WITH PLATINUM OVER GOLD AND SILVER IN 0.5 MOLAR $H_2SO_4$ WITH OXYGEN GAS AT 150° F.

| Polarization in Volts From Theoretical $O_2$ Electrode[1] | At Indicated Amps./Ft.[2] |
|---|---|
| 0.12 | 0 |
| 0.30 | 6 |
| 0.35 | 15 |
| 0.41 | 30 |
| 0.48 | 45 |
| 0.55 | 60 |

[1] Theoretical potential (at 150° F., 1 atmosphere, and 0.5 molar $H_2SO_4$) is 1.179 volts below (negative to) Standard Hydrogen Reference.

*Example 11*

A fritted glass electrode prepared as in Example 6 is employed as the oxygen electrode of a fuel cell. The polarizations obtained at different current densities are set forth in the following table:

TABLE IV.—PLATED GLASS FRIT CATHODE WITH PLATINUM OVER GOLD AND SILVER IN 0.5 MOLAR $H_2SO_4$ WITH OXYGEN GAS AT ROOM TEMPERATURE (70° F.)

| Polarization in Volts From Theoretical $O_2$ Electrode | At Indicated Amps./Ft.[2] |
|---|---|
| 0.25 | 10 |
| 0.58 | 100 |

Employed as the fuel electrode with methanol, hydrogen and cis-butene-2 as fuels, the following performances are obtained with this electrode.

TABLE V.—PLATED GLASS FRIT ANODE WITH PLATINUM OVER GOLD AND SILVER IN 0.5 MOLAR $H_2SO_4$ WITH INDICATED FUELS AND TEMPERATURES

| Fuel | Polarization in Volts From Theoretical Fuel Electrode | At Indicated Amps./Ft.[2] |
|---|---|---|
| $H_2$[a] | 0.05 | 50 |
| | 0.12 | 200 |
| | 0.22 | 300 |
| Methanol[a] | 0.50 | 50 |
| | 0.52 | 100 |
| | 0.54 | 300 |
| | 0.60 | 1,000 |
| Buene[b] | 0.51 | 5 |
| | 0.66 | 15 |
| | 0.77 | 25 |

[a] Room temperature about 70° F.
[b] 190° F.

*Example 12*

The electrode prepared in Example 8 is employed as the cathode of a fuel cell with a 30 wt. percent $H_2SO_4$ and 1 wt. percent $HNO_3$ catholyte. A platinum sheet is employed as the anode and methanol is employed as fuel. The anolyte and catholyte are partitioned by a membrane prepared as in Example 1. Oxygen gas is bubbled through the catholyte and current is drawn from the cell.

*Example 13*

The nickel plated electrode prepared in Example 7 is employed as the anode of a fuel cell employing a 6 normal aqueous solution of KOH as the electrolyte. Hydrogen gas is employed as the fuel. Oxygen gas is supplied to a platinum coated cathode and current is drawn from the cell.

*Example 14*

A membrane prepared as in Example 1 is compared with an untreated membrane of the same composition by placing different liquids on opposite sides of the membranes. Observation over different periods of time establishes no noticeable difference in the amount of diffusion and hence in porosity between the treated and untreated membranes. This metallized membrane measuring 10" x 10" is folded to opposite ends into contact with each other. There is no noticeable indication of cracking or other disengagement of metal from the membrane.

*Example 15*

A nonionic membrane, i.e. linear polystyrene and a nonionic binder, is metallized in accordance with Example 1 leaving a layer of silver upon which is electrodeposited platinum black. The membrane is employed as the anode of an electrolytic cell. A liquid electrolyte of 0.5 molar $H_2SO_4$ is employed and the cell operated at 180° F. Electrons are admitted to the cathode from an external source of DC power electrically connected to both anode and cathode, i.e. an alternating current rectifier, and butene-2 dissolved in the electrolyte is electrochemically oxidized at the surface of such anode in contact with such electrolyte and methyl ethyl ketone recovered from the electrolyte.

*Example 16*

A substrate comprising linear polystearate is coated with an alcohol-soluble wax. A circuit was traced on the substrate by scraping the wax therefrom. The wax coated substrate having the circuit traced thereon was subject to the procedure set forth in Example 1. After the circuit was metal coated, the wax was dissolved in alcohol and the substrate dried. The circuit was tested for and found to be electrically conductive.

*Example 17*

A 100 square inch rough ceramic plate was coated with paraffin. A desired form for an electrical circuit was traced on the substrate by scraping the paraffin therefrom. The paraffin-coated substrate having the circuit trace thereon was contacted with about 150 c. of a 2.5 gms./liter Toluylene Blue aqueous solution for about 8 minutes. The substrate was then contacted with an aqueous solution of $Na_2S_2O_4$ and 0.05 molar KOH. The substrate was then washed with distilled water until no dye was present in the wash water. The substrate in the wet state was then contacted with 150 ml. of 0.2 normal silver nitrate. The substrate turned blue and the dispersion of metallic silver was formed on the dyed surface. The substrate was then contacted with an aqueous solution containing 30 wt. percent of cupric sulfate to which is added about 10 wt. percent formaldehyde. A continuous film of copper is quickly formed over the dyed surface and the aforementioned catalyst sites. The substrate was then dried and immersed in benzene to dissolve the paraffin. The resulting substrate having the copper circuit thereon was tested for and found to be electrically conductive.

What we claim is:

1. A method of producing an electrical component which comprises the steps of:
(a) dyeing a substrate with a dye selected from the group consisting of an indamine, an indophenol, an oxazine, a thiozine, an indigoid and an azine, and
(b) contacting said dyed substrate with an aqueous solution of a salt of a metal selected from the group consisting of gold, platinum, palladium and silver thereby forming finely divided metal particles on the substrate.

2. An electrical component which comprises an electrically nonconductive substrate having a discontinuous coating of finely divided particles of a metal selected from a group consisting of gold, platinum, palladium and silver produced by the method defined in claim 1.

3. A method of producing an electrical component which comprises the steps of:
(a) dyeing a substrate with a dye selected from the group consisting of an indamine, an indophenol, an oxazine, a thiozine, an indigoid and an azine,
(b) contacting said dyed substrate with an aqueous sodium hydrosulfite solution,
(c) contacting said dyed substrate with an aqueous solution of a salt of a metal selected from the group consisting of gold, platinum, palladium and silver thereby forming a first coating of finely divided metal particles on the substrate, and
(d) contacting the substrate with an aqueous solution comprising a salt of a metal selected from the group consisting of silver, nickel and copper and a reducing agent to form a second coating of metal selected from the group consisting of silver, nickel and copper on the substrate.

4. A method as in claim 3 wherein the metal of the second coating is exchanged for a more electronegative metal by contacting the substrate with a solution of the salt of the more negative metal.

5. A method as in claim 3 wherein a metal is electrodeposited upon the second metal coating of the substrate.

6. A method of producing a porous electrical component which comprises the steps of:
(a) dyeing a porous substrate with an aqueous solution of a hydrosulfite and a dye selected from the group consisting of an indamine, an indophenol, an oxazine, a thiozine, an indigoid and an azine,
(b) contacting said dyed substrate with an aqueous solution of a salt of a metal selected from the group consisting of gold, platinum, palladium and silver thereby forming finely divided metal particles on the substrate, and
(c) contacting the substrate with an aqueous solution comprising a salt of a metal selected from the group consisting of silver, nickel and copper and a reducing agent thereby producing a metal coated component having substantially the same porosity as the uncoated substrate.

7. A method as in claim 6 wherein said indamine dye is selected from the group consisting of Bindschedler's Green and Toluylene Blue.

8. A method as in claim 6 wherein said azine dye is selected from the group consisting of phenosafranine, Induline Scarlet and Neutral Red.

9. A method of making an electrical component which comprises the steps of:
(a) contacting an interpolymer membrane with an aqueous solution of 2,6-dichlorophenol-indophenol and $Na_2S_2O_4$,
(b) contacting the said dyed membrane with an aqueous solution of a silver salt thereby forming finely divided metal particles on the substrate, and
(c) contacting the substrate with an aqueous solution of a copper salt and a reducing agent.

10. A method of producing an electrical component which comprises the steps of:
(a) dyeing a substrate with Methylene Blue,
(b) contacting said dyed substrate with an aqueous solution comprising 0.05 molar NaOH and 0.1 molar $Na_2S_2O_4$,
(c) contacting said dyed substrate with an aqueous solution of a salt of a metal selected from the group consisting of gold, platinum, palladium and silver thereby forming finely divided metal particles on the substrate, and
(d) contacting the substrate with an aqueous solution comprising a salt of a metal selected from the group consisting of silver, nickel and copper and a reducing agent, 11. A method of producing an electrical component which comprises the steps of:
(a) dyeing a substrate with an aqueous solution of gallocyanine and $K_2S_2O_4$,
(b) contacting said dyed substrate with an aqueous solution of a salt of a metal selected from the group consisting of gold, platinum, palladium and silver thereby forming finely divided metal particles on the substrate, and
(c) contacting the substrate with an aqueous solution comprising a salt of a metal selected from the group consisting of silver, nickel and copper and a reducagent.

12. A method of producing an electrical component which comprises the steps of:
(a) dyeing a substrate with indigo-disulfonate,
(b) contacting said dyed substrate with an aqueous solution comprising 0.05 molar NaOH and 0.1 molar $K_2S_2O_4$,
(c) contacting said dyed substrate with an aqueous solution of a salt of a metal selected from the group consisting of gold, platinum, palladium and silver thereby forming finely divided metal particles on the substrate,
(d) contacting the substrate with an aqueous solution comprising a salt of a metal selected from the group consisting of silver, nickel and copper and a reducing agent.

References Cited

UNITED STATES PATENTS 3,222,218 12/1965 Beltzer et al.

ALFRED L. LEAVITT, *Primary Examiner.*

W. L. JARVIS, *Assistant Examiner.*